US010230786B2

United States Patent
Parees et al.

(10) Patent No.: US 10,230,786 B2
(45) Date of Patent: Mar. 12, 2019

(54) HOT DEPLOYMENT IN A DISTRIBUTED CLUSTER SYSTEM

(71) Applicant: Red Hat, Inc., Raleigh, NC (US)

(72) Inventors: Benjamin Parees, Durham, NC (US); Michal Fojtik, Brno (CZ); Daniel McPherson, Raleigh, NC (US); Clayton Coleman, Raleigh, NC (US); Cesar Wong, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 5 days.

(21) Appl. No.: 15/055,512

(22) Filed: Feb. 26, 2016

(65) Prior Publication Data

US 2017/0249141 A1  Aug. 31, 2017

(51) Int. Cl.
G06F 9/44 (2018.01)
H04L 29/08 (2006.01)
G06F 11/36 (2006.01)
G06F 8/71 (2018.01)
G06F 8/656 (2018.01)
G06F 9/455 (2018.01)

(52) U.S. Cl.
CPC ............. *H04L 67/10* (2013.01); *G06F 8/656* (2018.02); *G06F 8/71* (2013.01); *G06F 9/45508* (2013.01); *G06F 9/45558* (2013.01); *G06F 11/3668* (2013.01); *H04L 67/34* (2013.01)

(58) Field of Classification Search
CPC ....................................................... G06F 8/70
See application file for complete search history.

(56) References Cited

U.S. PATENT DOCUMENTS

| 7,793,256 | B2 | 9/2010 | Charisius et al. |
| 8,327,351 | B2 | 12/2012 | Paladino et al. |
| 8,510,732 | B2 | 8/2013 | Chevrette et al. |
| 8,788,569 | B2 | 7/2014 | Griffiths et al. |
| 2003/0018950 | A1 | 1/2003 | Sparks et al. |
| 2010/0281458 | A1* | 11/2010 | Paladino .................. G06F 8/71 717/106 |
| 2011/0216651 | A1* | 9/2011 | Bansal .................... H04L 47/20 370/235 |

(Continued)

OTHER PUBLICATIONS

Howell (Web article: Turn the Deployment Scanner frequency down or turn it off if you do not hot deploy, Mar. 16, 2012, retrieved on Apr. 24, 2017, URL:https://developer.jboss.org/wiki/TurnDeploymentScannerDown).*

(Continued)

*Primary Examiner* — Hang Pan
(74) *Attorney, Agent, or Firm* — Lowenstein Sandler LLP

(57) ABSTRACT

Implementations provide for a source to image framework for a Platform-as-a-Service (PaaS) system in a distributed cluster system that can apply modifications to source code. A method of the disclosure includes invoking source-to-image (STI) methodology to execute an instance of an application image. The application image is associated with source code and an application framework of an application. A modification to the source code utilized in the instance is received and identified via the application framework utilized in the instance. The identified modification to the source code is applied during runtime of the instance in a container via the application framework.

20 Claims, 7 Drawing Sheets

(56) References Cited

U.S. PATENT DOCUMENTS

| | | | |
|---|---|---|---|
| 2014/0215452 A1* | 7/2014 | Hicks | G06F 8/65 717/172 |
| 2016/0028672 A1 | 1/2016 | Kaul et al. | |
| 2016/0134558 A1* | 5/2016 | Steinder | H04L 47/783 709/226 |
| 2017/0212830 A1* | 7/2017 | Thomas | G06F 11/3668 |

OTHER PUBLICATIONS

Bloe (Web article: Process Management in Docker Containers, dated Jun. 9, 2015, retrieved on Feb. 21, 2018, URL:https://blog.zhaw.ch/icclab/process-management-in-docker-containers/).*

"Ruby Hot Deploy" https://github.com/openshift/sti-ruby/tree/master/2.2#hot-deploy, GitHub, Inc. 2016, 3 pages.

"Python Docker Image" https://github.com/openshift/sti-python/tree/master/3.3#hot-deploy, GitHub, Inc. 2016, 4 pages.

"Copying Files to or From a Container" https://docs.openshift.org/latest/dev_guide/copy_files_to_container.html, OpenShift Community Documentation, accessed Mar. 1, 2016, 2 pages.

"Ruby" https://docs.openshift.org/latest/using_images/s2i_images/ruby.html#ruby-hot-deploy, OpenShift Community Documentation, accessed Mar. 1, 2016, 5 pages.

Parees, "NodeJS Docker Image" https://github.com/openshift/sti-nodejs/tree/master/0.10#hot-deploy, GitHub, Inc. 2016, 4 pages.

Simons, "Container-Managed Exception Handling for the Predictable Assembly of Component-Based Applications" http://www.cs.tufts.edu/tech_reports/reports/2004-2/original_report.pdf, May 2004, 108 pages.

Parees, "Python Docker Image" https://github.com/GrahamDumpleton/openshift-s2i-python/tree/master/3.4, Dec. 8, 2015, 4 pages.

"Red Hat JBoss Fuse" https://access.redhat.com/documentation/en-US/Red_Hat_JBoss_Fuse/6.0/html/Deploying_into_the_Container/files/ESBOSGilntro-Esb.html, Accessed Feb. 25, 2016, 2 pages.

"Hot Deploy Containers" http://www.swiftmq.com/products/router/swiftlets/sys_jac/hotdeploy/index.html, IIT Software GmbH 2000-2016, 3 pages.

"Hot Deployment and Dynamic Reloading" https://www-01.ibm.com/support/knowledgecenter/SSAW57_8.5.5/com.ibm.websphere.nd.doc/ae/trun_app_hotupgrade.html, Jan. 21, 2016, 5 pages.

* cited by examiner

HOT DEPLOYMENT IN A DISTRIBUTED CLUSTER SYSTEM

TECHNICAL FIELD

The implementations of the disclosure relate generally to hot deployment systems and, more specifically, relate to a hot deployment system in a distributed cluster system.

BACKGROUND

Distributed cluster systems include devices (including virtual machines (VMs)) that may be located remotely which work together to provide services or applications to clients. One type of a distributed cluster system is a Platform-as-a-Service (PaaS) system. A variety of PaaS system offerings exists that include facilities for facilitating the execution of applications in a cloud computing environment (the "cloud"). Cloud computing is a computing paradigm in which a customer pays a "cloud provider" to execute a program on computer hardware owned and/or controlled by the cloud provider. It is common for cloud providers to make VMs hosted on their computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of applications without the cost and complexity of buying and managing the underlying hardware and software and provisioning hosting capabilities, providing the facilities to support the complete life cycle of building and delivering web applications and services entirely available from the Internet. Typically, these facilities operate as VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding.

DETAILED DESCRIPTION

Figure 1:
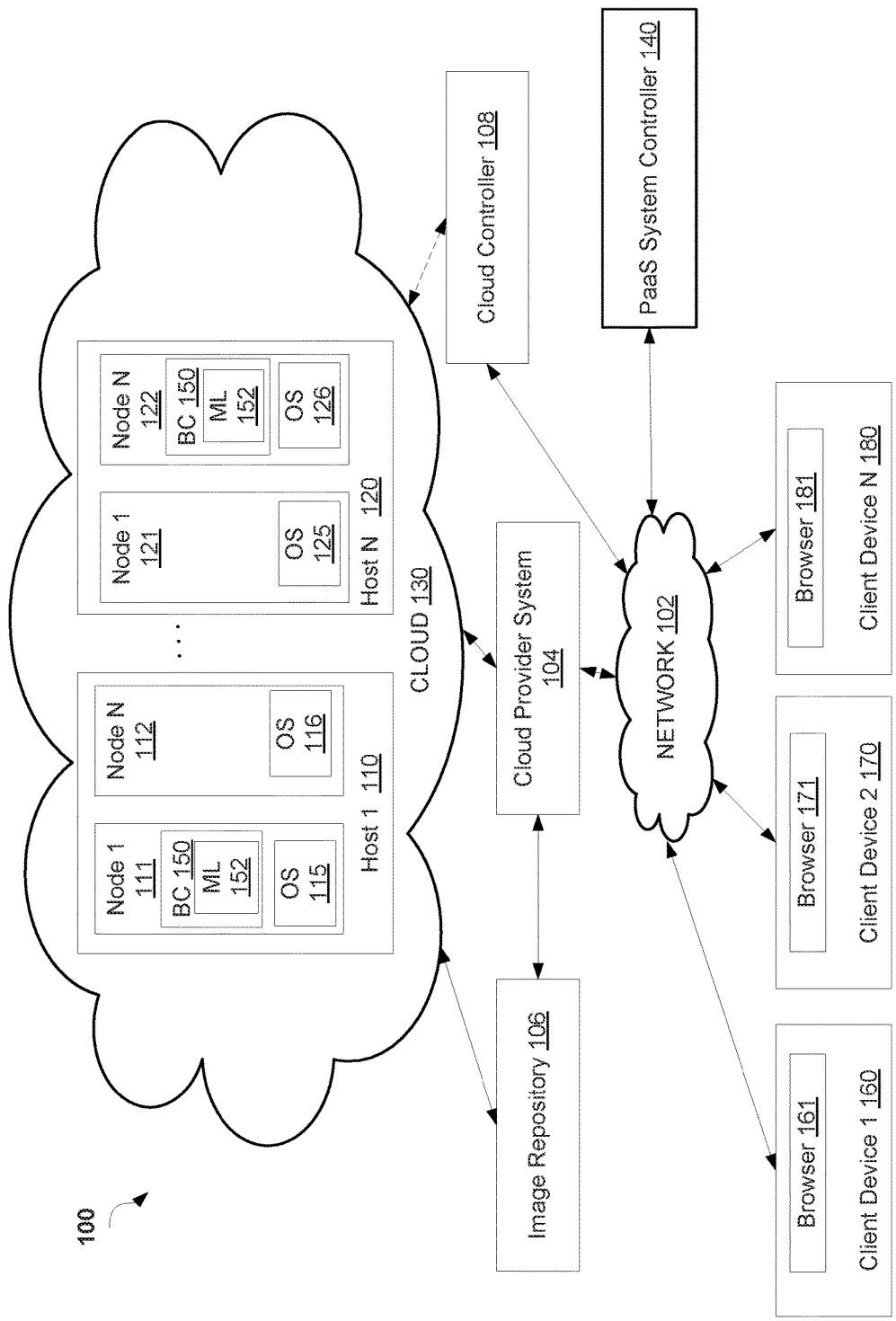
FIG. 1 is a block diagram of a network architecture in which implementations of the disclosure may operate.

Implementations of the disclosure provide for hot deployment in an image-based distributed cluster system. A distributed cluster system may refer to devices that may be located remotely which work together to provide services or applications to clients. One type of distributed cluster system is a Platform-as-a-Service (PaaS) system. Implementations of the disclosure provide a source-to-image (STI) methodology that is implemented as part of a PaaS system. In some implementations, STI methodology is also referred to as S2I methodology. The PaaS system may be a distributed cluster system having multiple nodes. A node may refer to a physical computing device or a virtual computing device, such as a virtual machine (VM). The STI methodology can be implemented a node of the PaaS system.

The PaaS system may enable execution of an application via application image(s). An application image (or an image) refers to data representing executables and files of an application used to deploy functionality for a runtime instance of the application. The PaaS system may implement a build container that is used to create an application image. An image of an application may be used to launch runtime containers on nodes of the PaaS system. A container is a resource-constrained process space on a node that may execute a particular functionality of an application. The application image is used to launch containers that execute respective instances of the application image (also referred to herein as "application image instance"). In some implementations, launched containers with an executing application image instance may be referred to herein as "running containers." When the application image instance is executed in a container, a particular functionality of the application is performed. The application image instances within the containers are executed during runtime of the application. Runtime may refer to the execution of the processes of the application.

In one implementation, a runtime container receives a modification to source code. The modification is to be hot deployed. Hot deployment provides for implementation of a modification without interrupting execution of a container that executes application image instances of the application. The runtime container runs a modification logic framework to modify the source code of the running container launched from application images in the PaaS system.

Previous solutions for applying modifications to source code include cold deployment. Cold deployment provides for implementation of a modification after application image instances of the application are relaunched. Cold deployment does not allow a modification to be implemented while application image instances of an application are executed. Therefore, in previous solutions, if hot deployment is not utilized by an application, new images may be created every time a modification is to be applied to source code. As described above, an image may be built using a build container, and the application may be executed. Runtime container(s) may then be launched from the image. If a developer wishes to modify source code of the container, the developer would build a new version of the image. For every modification, the developer would have to build another new version of the image with a respective modification injected into an image. The developer may have to build multiple versions of images, which may utilize additional resources and overhead. Additionally, when a new version of an image is built, any runtime containers launched from the older version of the image are removed and new runtime containers are launched from the new version of the built image. Thus, images may not be changed without building a new version of the image. Additionally, a runtime container may not be restarted without reverting to the image it was created from. Implementations of the disclosure address the shortcomings of the previous solutions by implementing modifications to source code in a runtime container while the application image instances are executed without restarting the application image instances. Thus, the modifications may be hot deployed.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host machine 1 110 through host machine N 120, as part of the cloud 130. In some implementations, the host machines 110, 120 are often located in a data center. For example, nodes 111 and 112 are hosted on host machine 110 in cloud 130 provided by cloud provider system 104. Each host machine 110, 120 may include a hypervisor (not shown). When nodes 111, 112, 121, 122 are implemented as VMs, they may be executed by OSes 115, 116, 125, and 126, respectively.

Users can interact with applications executing on the cloud-based nodes 111, 112, 121, 122 using client computer systems, such as client devices 160, 170 and 180, via corresponding web browser applications 161, 171 and 181, respectively. Client device 160, 170, and 180 may include a copy of the source code that is included in containers within nodes 111, 112, 121, 122. In an implementation, the copy of the source code stored locally may be modified by client devices 160, 170, 180. Changes made by the modification(s) to the source code at client device 160, 170, and 180 may be synchronized with the source code of containers within nodes 111, 112, 121, 122. Details regarding the synchronization are described further below.

In some implementations, the host machines 110, 120 are often located in a data center. In other implementations, the applications may be hosted directly on host machines 1 through N 110-120 without the use of VMs (e.g., a "bare metal" implementation), and in such an implementation, the hosts themselves are referred to as "nodes".

Client devices 160, 170, and 180 are connected to host machines 110, 120 in cloud 130 and the cloud provider system 104 via a network 102, which may be a private network (e.g., a local area network (LAN), a wide area network (WAN), intranet, or other similar private networks) or a public network (e.g., the Internet). Each client device 160, 170, 180 may be a mobile device, a PDA, a laptop, a desktop computer, a tablet computing device, a server device, or any other computing device. Each host machine 110, 120 may be a server computer system, a desktop computer or any other computing device. The cloud provider system 104 may include machines such as server computers, desktop computers, etc.

In one implementation, the cloud provider system 104 is coupled to a cloud controller 108 via the network 102. The cloud controller 108 may reside on machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider system 104 and stored in an image repository 106, in an image repository (not shown) located on each host machine 110, 120, or in an image repository (not shown) located on each VM 111, 112, 121, 122.

Upon receiving a command identifying specific data (e.g., application data and files used to initialize an application on the cloud), the cloud provider system 104 retrieves the corresponding data from the image repository 106, creates an instance of it, and loads it to the host machine 110, 120 to run on nodes 111, 112, 121, 122. In addition, a command may identify specific data to be executed on of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on mass storage devices, such as magnetic or optical storage based discs, solid-state-drives (SSDs) or hard drives.

In one implementation, nodes 111, 112, 121, 122 include a build container (BC) 150. BC 150 can be implemented on one of the nodes 111, 112, 121, 122 of the PaaS system. In implementation, BC 150 may be implemented on one of the nodes in each PaaS system. Alternatively, BC 150 may be implemented on a subset of the nodes 111, 112, 121, 122 or on each of the nodes 111, 112, 121, 122. In one implementation, BC 150 includes a modification logic (ML) 152 framework. BC 150 may assemble ML 152 into a runtime container of an application at build time. At runtime, the modification logic that runs on the runtime container implements changes to source code of the runtime container. Specifically, the modification logic allows modifications to be made to source code of a running container of an application in the PaaS system. The BC 150 includes user-provided source code for an application. The source code may be injected in a base image providing a structure and/or core functionality for the application (e.g., base framework used by the application) in order to assemble an application image instance (i.e., base image+source code) for running the application on the PaaS system. When a modification to the source code is to be made during runtime of the application image instance in the runtime container of application, the modification logic in the runtime container causes the modification to be applied to the source code. The modification to the source code may be made by a user such as a developer employing client device 160, 170, and 180. The modification logic may apply the modification to the source code included in nodes 111, 112, 121, 122. Further details of BC 150, ML 152, modification logic on a runtime container and related workflows can be found below with respect to FIG. 2 through 6.

While various implementations are described in terms of the environment described above, the facility may be implemented in a variety of other environments including a single, monolithic computer system, as well as various other combinations of computer systems or similar devices connected in various ways. For example, the data from the image repository 106 may run directly on a physical host machine 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
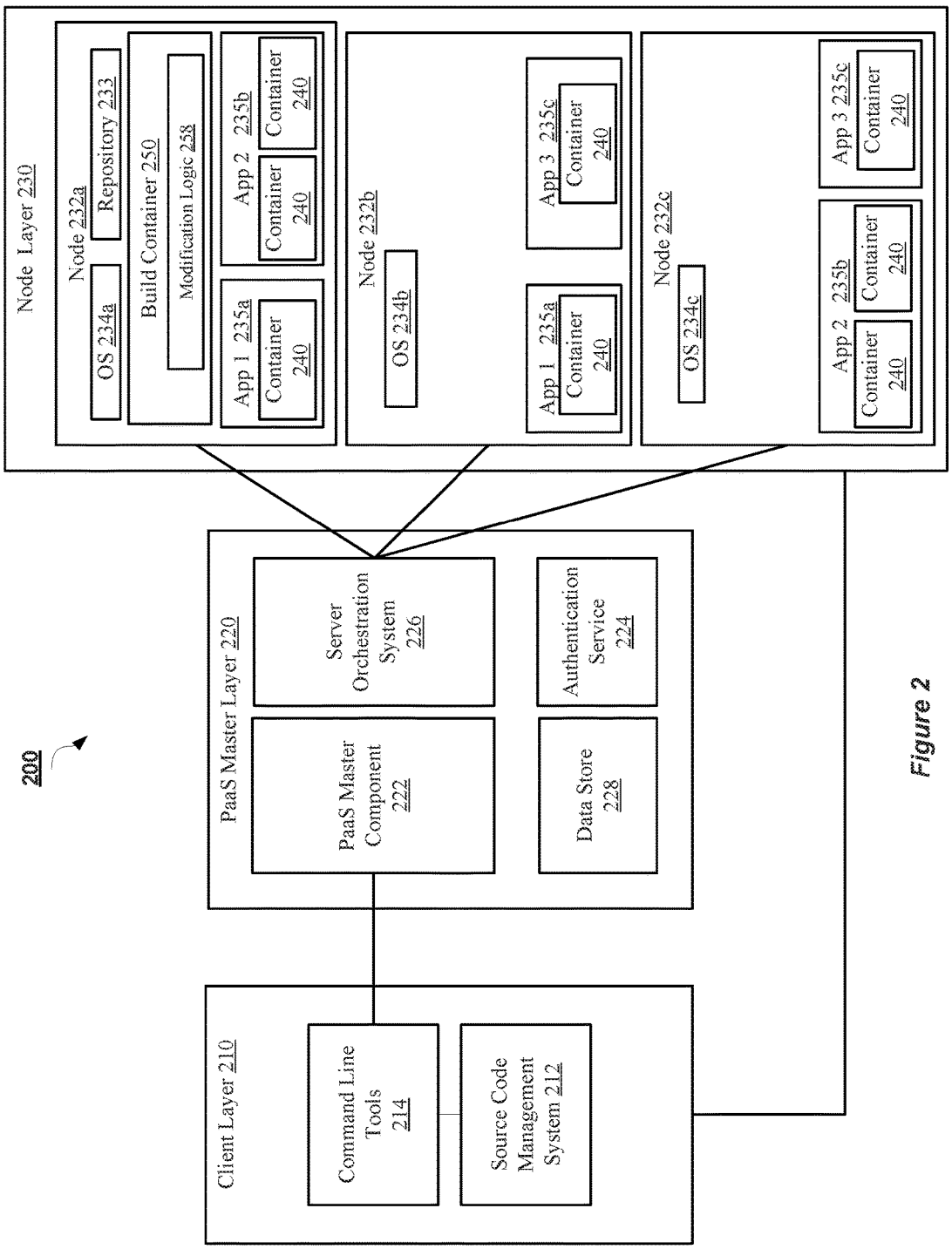
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS system architecture 200 allows users to launch and modify applications in a cloud computing environment, such as a cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a developer, and provides an interface to a user of the client machine to the PaaS master layer 220 of the PaaS system architecture 200. In one implementation, the client machine can be a client device 160, 170, 180 described with respect to FIG. 1. The PaaS master layer 220 may facilitate the creation and deployment on the cloud (via node layer 230) of applications being developed by a user at client layer 210.

In one implementation, the client layer 210 includes a source code management system 212, sometimes referred to as "SCM" or revision control system. One example of such an SCM or revision control system is Git, available as open source software. Git and other such distributed SCM systems typically include a working directory for making changes, and a local repository for storing the changes for each application associated with the user of the PaaS system architecture 200. The packaged application can then be "pushed" from the local SCM repository to a remote SCM repository. A local SCM repository such as repository 233 may be provided at the node 232a running an associated application. In another implementation, additional repositories than depicted may be provided. From the local SCM repository 233, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-b are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on machines, such as server computers, desktop computers, etc. In some implementations, the PaaS master layer 220 may be implemented on machines separate from machines implementing each of the client layer 210 and the node layer 230, or may be implemented together with the client layer 210 and/or the node layer 230 on machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code and/or binary content of an application, a request to update source code and/or binary content of an application within a container, a request to designate a system to host a remote SCM repository (e.g., an indication that a system has been designated by a user to host a remote SCM repository), etc.

In one implementation, a user, using the command line tools 214 at client layer 210, can request the creation of a new application 235a-b, deployment of source code of the application 235a-b, update of the source code of the application 235a-b, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-b residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232*a-c* and their applications 235*a-b* to model the application hosting service and to maintain records about the nodes. In one implementation, data of a node 232*a-c* is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232*a-c* runs multiple applications 235*a-b* that may be owned or managed by different users and/or organizations. As such, a first customer's deployed applications 235*a-b* may co-exist with any other customer's deployed applications on the same node 232 that is hosting the first customer's deployed applications 235*a-b*. In some implementations, portions of an application execute on multiple different nodes 232*a-c*. For example, as shown in FIG. 2, components of application 1 (235*a*) run in both node 232*a* and node 232*b*. Similarly, components of application 2 (235*b*) may run in node 232*b* and node 232*c*.

In one implementation, each node 232*a-c* is implemented as a VM and has an operating system 234*a-c* that can execute applications 235*a-c* using the repository 233 that is resident on the node 232*a*. Each node 232*a-c* also includes a server orchestration system agent (not shown) configured to track and collect information about the node 232*a-c* and to perform management actions on the node 232*a-c*. The server orchestration system agent may operate in tandem with the server orchestration system 226 to send requests, queries, and commands between the node 232*a-c* and the PaaS master layer 220.

A node 232*a* may include a build container 250 which includes modification logic 258. The build container 250 may be the same as BC 150 described with respect to FIG. 1. The modification logic 258 may be the same as ML 152 described with respect to FIG. 1. In one implementation, build container 250 provides a logic framework to produce ready-to-run application images for applications 235*a-c* of the PaaS system. Each application image may map to a functional component of the application 235*a-c*. As such, an application may have more than one application image associated with the application. The application images include support software providing functionality (e.g., configuration templates, scripts, dependencies, etc.) used to run the application 235*a-c* and/or add a feature to the application 235*a-c*. For example, the images may support languages such as, but not limited to, Java™, PHP, Ruby, Python, Perl, and so on. In addition, application images may be generated that support databases, such as MySQL™, PostgreSQL™, Mongo™, and others. Application images may also be generated that support build and continuous integration environments, such as a Jenkins-based image. Lastly, application images may be generated to support management capabilities and/or tools, such as PHPmyadmin, Rock-Mongo™, 10gen-mms-agent, cron scheduler, HAProxy, Maven, and Gradle for example. In an implementation, one build container 250 may be used for multiple nodes of the PaaS system. In an alternative embodiment, respective build containers may run all nodes or on a subset of the nodes of the PaaS system.

The BC 150 can be implemented on each of the nodes 111, 112, 121, 122 of the PaaS system or, alternatively, on a subset of the nodes 111, 112, 121, 122. In some implementations, a separate node 232*a-c* may be provided that is dedicated to implementing STI methodology for all nodes 232*a-c* and applications 235*a-c* of the PaaS system architecture 200.

Build container 250 creates a usable runtime image for the application in the PaaS system architecture 200. Build container 250 may include a user-provided source code of an application. The source code may be injected into a base image providing core functionality for the application in order to assemble a ready-to-use application image for runtime of the application on the PaaS system. Once build container 250 builds an application image, the application image may be committed to a repository, such as repository 233, or to a remote repository (not shown) outside of nodes 232. The committed application image may then be used to subsequently launch the application 235*a-c*.

As discussed above, the application images may include underlying support (e.g., binaries providing dependencies, configuration scripts, etc.) that implements the functionality of applications 235*a-c*. In one implementation, an application 235*a-c* may utilize resource-constrained containers 240 on nodes 232*a-c* using instances of application image. A container 240 is a resource-constrained process space on the node 232*a-c* to execute functionality of an application 235*a-c*. In some implementations, a container 240 is established by the node 232*a-c* with resource boundaries, including a limit and/or designation of the amount of memory, amount of storage, and security types and/or labels to be applied to any functions executed by the container 240. In one implementation, containers 240 may be established using the Linux Containers (LXC) virtualization method. In further implementations, containers 240 may also be established using cgroups, SELinux™, and kernel namespaces, to name a few examples. In some implementations, build container 250 is implemented as a separate container on nodes 232*a-c*.

Application image instances for an application 235*a-c* may be launched in containers 240 dispersed over more than one node 232*a-b*. In other implementations, application images instances for an application 235*a-c* may run in containers 240 on the same node 232*a-c*. Furthermore, an application 235*a-c* may use more than one application image 240 as part of providing functionality for the application 235*a-c*. One example of this is a JavaEE™ application that uses a JBoss™ application server-based application image with a supporting MySQL™ database provided by a MySQL™-based application image.

After the application is built, committed to the repository, and running, PaaS master component 222 of PaaS master layer 220 may receive a modification to be made to source code of the application at runtime in the PaaS system. In one implementation, hot deployment refers to implementing changes to an application (i.e., to source code of an application) without restarting or rebooting the application. Without using hot deployment, changes may not be made to an application while the application is running. A user, such as a developer, may wish to implement a modification to source code of the running container 240 when the application 235*a-c* is running. In order to implement a modification to source code of a runtime container, an application framework and a modification logic running in the runtime container is utilized. Further details of the application framework and hot deployment process to apply a modification to source code during runtime of the application image instance in the runtime container are described below with respect to FIG. 3.

A developer may wish to implement changes to a container of an application while the application is running using hot deployment for a number of reasons. For example, a user (e.g., developer) may wish to test a particular functionality of an application while the application is running. In an implementation, the user may wish to observe the behavior of the application in order to test whether the modification should be implemented. If the modification produces a desired modified application, the user may wish to permanently adopt the modification to the source code of the application for future use. The user may create a new version of an image of the application with the modification baked in and/or injected (e.g., the image of the application is updated to apply the modification) into the source code. The modified application may be rebuilt and recommitted to a repository in order for the modification to the source code to be implemented permanently. The application including the new image may then be executed to launch a new container and thus produce a desired product. Without using hot deployment, the user may not implement the modification to the source code during runtime of the application image instance in the container. Details regarding images are described herein with respect to FIG. 3.

Figure 3:
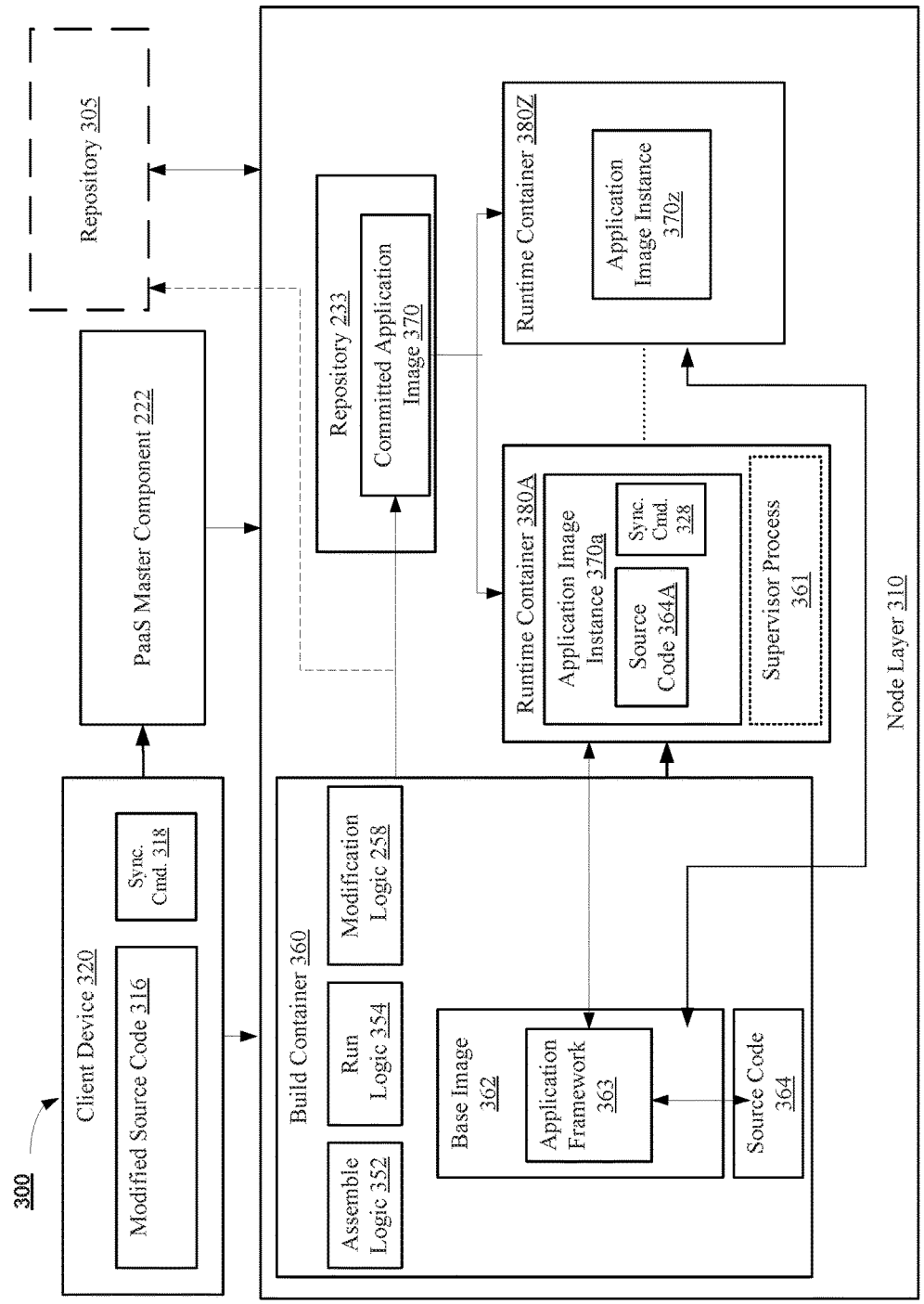
FIG. 3 is a block diagram of a communication architecture of a multi-tenant PaaS providing hot deployment for containers according to an implementation of the disclosure.

FIG. 3 is a block diagram of a communication architecture of a multi-tenant PaaS providing hot deployment for running containers according to an implementation of the disclosure. Architecture 300 includes the PaaS master component 222 in communication with a client device 320 and node layer 310. Node layer 310 includes build container 360, modification logic 258, repository 233, and runtime containers 380A-380Z (also referred to herein as 380) distributed across nodes of node layer 310. Client device 320 includes modified source code 316 and a synchronization command (sync. cmd.) 318. PaaS master component 222, build container 250, modification logic 258, and repository 233 may be the same as their counterparts described with respect to FIG. 2.

Referring again to FIG. 3, in one implementation, PaaS master component 222 may receive a request to build an application (either via an API or another trigger event communicated from client device 320). The PaaS master component 222 may then launch build container 360. The build container 360 may be a resource-constrained process space on the node layer 310 that executes functionality to combine a base image 362 and source code 364 to create an application image. Source code 364 may also be referred to as an application source code. The base image 362 includes an application framework 363. In some implementations, build container 360 is established with resource boundaries, including a limit and/or designation of the amount of memory, amount of storage, and security types and/or labels to be applied to any functions executed by the build container 360.

Build container 360 runs assemble logic 352 using a base image 362 registered for the requested application (not shown). In one implementation, the user identifies the base image 362 when the user registered the application with the multi-tenant PaaS system. This may allow users to identify images external to the multi-tenant PaaS for use in the multi-tenant PaaS. The base image 362 may be maintained in a repository of the multi-tenant PaaS, such as repository 233 of node layer 310, or in a remote repository 305 maintained outside of node layer 310. The base image 362 may be associated with core functionality of the application, such as an application framework 363. Application frameworks include, but are not limited to, PHP™, Ruby™, J2EE™, and so on.

The assemble logic 352 run by build container 360 may apply the source code 364 (e.g., binaries, zipped source, source code, etc.) to the base image 362 to build or assemble a new application image. The source code 364 may be provided to build container 360 through various delivery methodologies. In one implementation, the source code 364 may be streamed, for example, as a tar file to the build container 360. The source code 364 may be streamed from a client device of a user, or from another remote location indicated by the user. In another implementation, the source code 364 may be bind-mounted to the build container 360. In a further implementation, the source code 364 may be accessed or downloaded using a remote Uniform Resource Locator (URL) provided to build container 360. In some implementations, when the source code 364 is obtained via a URL, the source code 364 download is performed prior to the assemble logic 352 building/assembling the new application image and then streamed as part of a tar file provided to the build container 360 or used as part of a bind mount.

When the new application image is built, the assemble logic 352 run by build container 360 causes the application image to be committed to a repository 233, 305. The committed application image 370 may then be used to subsequently launch the application 350. Build container 360 may provide run logic 354 that defines behaviors to be executed when runtime containers 380A-Z are launched from the committed application image 370. Multiple runtime containers 380A-Z may launch using instances 370a-z of committed application image 370 in order to scale up the functionality provided by committed application image 370 in application 350. Each application image instance 370a-z may include a respective source code. For example, application image instance 370a includes source code 364A. Additional application image instances and source code than depicted in FIG. 3 may be included in application 350. Runtime container 380A may also include a supervisor process 361. Supervisor process 361 may be optional and may be included if the application framework 363 is to be restarted after the implementation of the modification to source code 364A. Details regarding supervisor process 361 are described further below.

In an implementation, the build container 360 may be terminated after the committed application image 370 is created.

In some implementations, assemble logic 352, modification logic 258, and run logic 354 may be provided as part of base image 362. In another implementation, the assemble logic 352, modification logic 258, and run logic 354 may be external to the base image. The latter scenario allows users that wish to utilize the base image 362 to be able to modify the assemble logic 352, modification logic 258, and run logic 354 to perform differently. In addition, the latter scenario allows users to share the same scripts for the assemble logic 352, modification logic 258, and/or run logic 354 across multiple different images. The assemble logic 352, modification logic 258, and/or run logic 354 across multiple different images, which may be scripts, may be assembled into runtime containers 380 when build container 360 builds the application. Therefore, the assemble logic, modification logic, and/or run logic may run on runtime containers 380.

Runtime container 380A also includes sync. cmd. 328 which may be substantially similar to sync. cmd. 318 on client device 320 or compatible with sync. cmd. 318. Sync. cmd. 328 may receive a modification to source code transmitted by sync. cmd. 318 after the committed application image 370a is built and during runtime of the application image instance 370A in the runtime container 380A. The modification may be transmitted by client device 320 to PaaS master component 222 which communicates with and transmits the modification to sync. cmd. 328 in application image instance 370a in runtime container 380A. The runtime container 380A may then transmit a notification of the modification to modification logic running (not shown) within runtime container 380A. The modification logic running within runtime container 380A may then apply the modification. In an implementation, each application image instance may include a respective synchronization command (sync. cmd.) and/or source code.

The committed application image 370, after being committed to the repository 233, 305, may be considered immutable. An immutable image may not allow modifications to the application code (i.e., source code 364) that is used to create the immutable image. Further, when an application image instance (i.e., application image instance 370a-370z) within a container (i.e., runtime container 380A-380Z) is executed, no additional prompts except for starting and stopping execution of the application image instance may be supported. Therefore, in prior solutions, modifications to source code may not be made once a container is launched from an application image. Moreover, multiple containers may be launched from an image. If one of the multiple containers is lost or corrupted, another replacement container that is substantially identical to the lost container may be launched as a replacement. When a modification is made to a container, the modification may not be applied or injected into the image. Therefore, if a modified container is lost or corrupted, the modifications may not be recoverable.

Although modifications to code are referred to as modifications to source code, the modifications may be made to any code including a binary artifact, etc. For example, if compiled binary content is included in the runtime container and the modification is to be applied to the binary content to synchronize the binary content in the runtime container with a modification made to source code at the client device, the modification may be made to the binary content in a similar manner as described above with respect to the source code. In an example, suppose that a user (e.g., a developer) performs a modification to local source code on a client device. The user may build new binary content and provide the new binary content (or the modification to the binary content) to the runtime container in a similar manner as the source code. The runtime container may then receive the modification and the modification may then be hot deployed. Thus, source code, binary content, etc. may be hot deployed in a manner described above. In an implementation, source code may be modified in a system using interpreted languages as the source code may run directly on the system. In another implementation, binary content may be modified in a system using compiled languages as compiled languages may execute binary artifact.

Further, although the term modification may be used, modifications to the source code and/or the binary content may be implemented.

A user such as a developer may wish to modify or alter the code of an application. For example, a developer may wish to test a particular functionality of an application while the application is running by modifying the code. The developer may be operating client device 320. The developer may implement a modified source code 316 on client device 320 to modify a portion of the source code. Prior to transmission of the modified source code 316 to node layer 310, the source code 364A may not include the modification set forth in the modified source code 316. The developer may wish to synchronize the changes between the client device 320 and the build container 360 (and/or other containers such as runtime containers 380A-380Z). The developer may modify the source code by using a command line interface (CLI) or by other means.

Once the developer wishes to synchronize the changes in the modified source code 316 to the remote container in node layer 310, the developer uses sync. cmd. 318 to deliver the changes. Sync. cmd. 318 recognizes the modification in the modified source code 316 and streams the changes to PaaS master component 222 which sends the modification to sync. cmd. 328. Sync. cmd. 328 may notify modification logic running in runtime container 380A of the modification. The modification logic running in runtime container 380A may apply the modification to source code 364A.

In an implementation, the modification(s) may be securely streamed via a tunnel from the client device 320 to PaaS master component 222 to the node layer 310. Modifications that are streamed may be transmitted as data packets from the client device 320 to the node layer 310. Streaming refers to a process of transmission of a modification from one device to another using a transmission protocol. A tunnel may be an Internet protocol (IP) network communications channel between two networks. For example, the client device 320 may be implemented on a first network and the node layer 310 may be implemented on a second network. In an implementation, the sync. cmd. 318 may stream portions of the code that are modified to sync. cmd. 328, via PaaS master component 222. In another implementation, the sync. cmd. 318 may stream the entire modified source code 316 to node layer 310. As sync. cmd. is set up on both the receiving and the transmitting ends, the modification to the source code or the modified source code may be streamed between remote devices. In an implementation, client device 320 may be located remotely from node layer 310. In an alternate implementation, client device 320 may locally access node layer 310. Thus, sync. cmd. 328 is used to synchronize source code 364A with modified source code 316. Source code 364A is utilized in application image instance 370a.

In another implementation, sync. cmd. 318 on client device 320 includes a source directory that includes the modified source code 316. Sync. cmd. 328 on runtime container 380A may or may not include a destination directory. If sync. cmd. 328 does not include a destination directory or a destination directory does not exist, sync. cmd. 328 may create a destination directory when a modification to the source code is received by runtime container 380A. When a destination directory is available to be used by sync. cmd. 328, sync. cmd. 318 may stream a modification to the source code. That is, sync. cmd. 318 may not stream the entire modified source code 316 but may stream a modification to the source code (i.e., the differences between source code 364 and modified source code 316).

If the destination source code (i.e., source code 364A) includes data (i.e., files, etc.) that is to be deleted in order for the destination code to correspond to the modified source code 316, sync. cmd. 318 may transmit a delete flag identifying the name(s) of the files that are to be deleted at the destination source code. Once sync. cmd. 328 receives the delete flag, sync. cmd. 328 can mark the files in the source code for deletion.

In another implementation (not shown), if sync. cmd. 318 is not available on client device 320 and/or if sync. cmd. 328 is not available on runtime container 380 on node layer 310, the modified source code 316 may be streamed, for example, as a tar file and/or a tar archive to the runtime container 380. The PaaS master component 222 may extract the tar file which includes the modification to the source code.

Once the modification is received by sync. cmd. 328, the modification is to be applied to the source code 364A. In order to inject the modification to source code 364A of a container 380A, the application framework 363 scans source code(s) in the container(s) for the modification. The application framework 363 may be enabled by the build container 250, in view of a user command, to perform a scan process. In an implementation, upon receipt of the modification, build container 250 may enable the application framework 363 to scan the source code 364A for the modification. In an implementation, a user operating client device 320 may provide a command to enable or disable the application framework 363 scan process during or after transmission of a modification from sync. cmd. 318. When the application framework 363 is enabled or disabled to perform the scan process, a bit may be set indicating that the scan process is enabled or disabled. In an implementation, the scan process may be enabled when a modification to source code is to be implemented. If no modifications to the source code are to be implemented, the scan process may be disabled. In an implementation, enabling or disabling the scan process may be performed when an application image is built or deployed. Once a container is running, the scan process may not be enabled or disabled. Enabling the scan process may be associated with additional costs such as additional memory or resources used to perform the scan process. Additionally, scanning for a modification to the source code may take additional time. Disabling the application framework from scanning the container may be in response to receiving a user request to disable the scanning. As described above, the disabling prevents further modification to the source code.

Disabling the scan process when no modifications are to be made may provide a more secure environment as resources used to perform the scan process are not prone to attacks. When the scan process is enabled, the runtime container may become temporarily mutable. When the scan process is disabled, the container may return to an immutable state. Using a bit to enable/disable the scan process may allow the container to switch between temporary mutable and immutable states. As described above, enabling or disabling the scan process may occur statically during build or deployment of an application image. As enabling or disabling of the scan process is static, once a container is running, the scan process may not switch from being enabled to disabled and vice versa. In an implementation, an application framework may or may not support static enablement/disablement of the scan process such that the scan process can be turned off and on and vice versa. Rebuilding or redeployment of the application may provide for enabling or disabling the scan process.

In order to implement a modification using hot deployment, certain application frameworks are to be restarted before the modification is applied. Other application frameworks may implement a modification without restarting. Application frameworks, such as application framework 363, that restart after implementing a modification may utilize a supervisor process. Runtime container 380A executes supervisor process 361. Supervisor process 361 may continually run while the application framework restarts. A container may not terminate when the application framework 363 (and a process of the application) stops or restarts as the supervisor process 361 is running. Otherwise, if a container terminates, the modification may be lost. Supervisor process 361 may optionally scan the source code for the modification if the application framework does not perform the scan process. Supervisor process 361 may also restart the application framework 363 if the application framework 363 may not restart itself. After the application framework 363 restarts the modification to source code 364A may be applied. The node layer 310 may prevent the modification to source code 364A from being lost upon restarting by wrappering the application framework 363 in the supervisor process 361. The wrappering of the application framework may include wrappering an application server (not shown) which provides a particular functionality of an application framework). Wrappering is a subroutine that calls a second subroutine with little or no additional computation or overhead to protect the modification while the application server is restarted. Supervisor process 361 allows the application server to restart without stopping container 380A and preserving ephemeral source code changes resulting from applying the modification to source code 364A. The scanning process performed by the application framework 363 may then be disabled after the modification is applied.

As described above, in one implementation, the application framework 363 performs the scan process if the application framework 363 supports the scan process. In another implementation if the application framework 363 does not support the scan process (and may not scan for modifications), the supervisor process 361 may perform the scan process and implement hot deployment to apply a modification.

In order to implement a modification to a destination source code in a running container (such as runtime container 380A-380Z) to synchronize the destination source code (i.e., 364A) with the modified source code 316, the container may be scaled to a single container or the modification may be applied to all copies of runtime containers launched from the committed application image 370 for purposes of consistency. Scaling refers to taking multiple instances of the application image within multiple containers and reducing them down to a single instance within a single container. If scaling is not applied, the application framework may apply the modification to respective source codes of each instance of an application image.

The committed application image 370 may be associated with runtime container(s) 380A-380Z. For example, the committed application image 370 may launch a first runtime container (i.e., 380A), a second runtime container (i.e., 380Z), . . . , etc. When a modification to source code of the second runtime container is applied, the image or the first runtime container (or any additional containers) may not be modified. Therefore, varying versions of the source code may exist. To prevent different versions of the source code, the build container 250 may scale the runtime containers (and the application image instances) down to a single container having a single application instance. For example, the runtime containers may be scaled to runtime container 380A and application image instance 370a and there may be no additional containers/application image instances as other containers may be scaled down to the runtime container 380A. Thus, when the source code of the single application instance is modified, no discrepancy between containers or source codes exists.

In another implementation, multiple containers may have respective application image instances and respective source codes. When source code 364A of runtime container 380A is modified, the application framework 363 may apply the same modification to source code (not shown) of runtime container 370Z. The application of the modification to the various source codes may be made for purposes of consistency. Containers having the same modified source code are referred to as load balanced containers. After the containers are load balanced, all source codes are substantially similar to one another. This way, when a modification is applied to one source code (i.e., source code 364A) of one container (i.e., runtime container 380A), the modification may also applied to other source codes of other containers (i.e., runtime container 380Z) such that containers are load balanced.

The application framework 363 applies the appropriate modification to destination source code(s) (source code 364 and/or to source code 364A and/or to other source codes). The modification applied to the destination source code 364A is embodied in modified source code 316 and the destination source code 364A becomes a copy of the modified source code 316.

Committed application image 370 may be modified to add logic to support hot deployment. The logic may also support enabling and disabling of hot deployment (via application framework 363).

Once source code of a container has been modified, the PaaS master component 222 may provide a mark or identification indicating that the container(s) have been changed. As the modification to the source code is transmitted by the client device 320 to the PaaS master component 222, the PaaS master component 222 is able to track which containers have been changed and can thus mark those containers. The identification to the container may alert a developer that the container includes a modification to the source code. The developer may then back up a copy of the modification so that if the container is restarted, the developer may recover the changes. The modification may not exist within the image of the container but rather in temporary or ephemeral storage within the container. A container that is marked as having changes stored in ephemeral storage may be referred to as a "dirty" container by the PaaS master component 222. A dirty container may be tracked by a developer so that if the container is to be restarted or scaled up or down, the developer can back up changes in view of the modification so that the changes are not lost.

Figure 4:
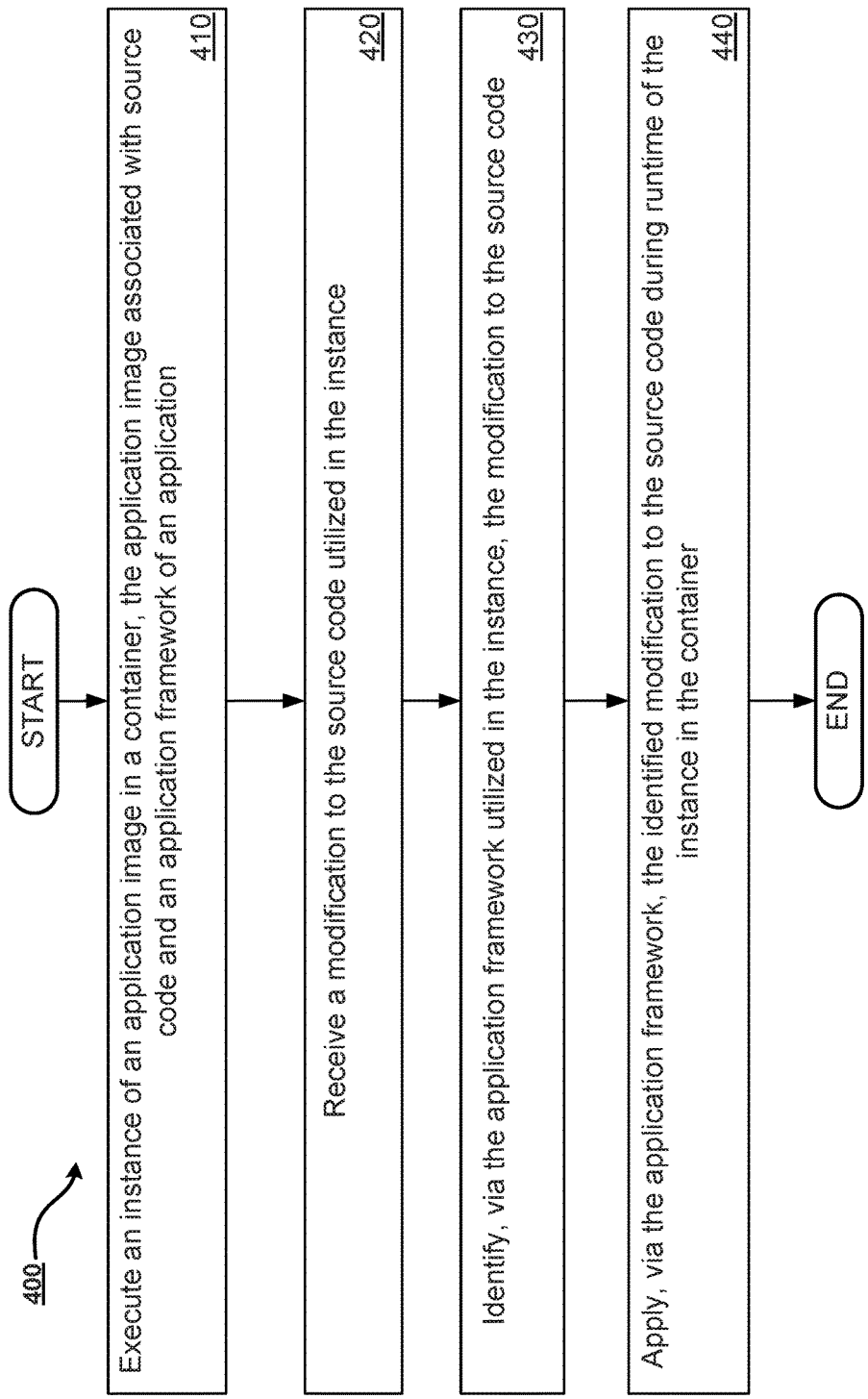
FIG. 4 is a flow diagram illustrating a method for modifying source code of an application image instance according to an implementation of the disclosure.

FIG. 4 is a flow diagram illustrating a method 400 for modifying source code of an application image instance according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by node layer 230, including any of nodes 232a-c, of FIG. 2 and/or node layer 310 of FIG. 3.

Method 400 begins at block 410 an instance of an application image in a container is executed. In one implementation, the image is associated with source code and an application framework of an application. Referring to FIG. 3, application image instance 370a-370z in runtime containers 380A-380Z, respectively, is executed. Application image instance 370a-370z may be launched from committed application image 370 of application 350. Committed application image 370 is associated with source code 364A and application framework 363.

In one implementation, a base image may be associated with the application framework. For example, the base image 362 may be associated with core functionality of the application, such as the application framework 363. The base image may be identified by a user. The user may provide a location of the base image, such as a local or remote repository that maintains the base image. For example, the user may provide a URL where the base image may be accessed.

Referring again to FIG. 4, at block 420, a modification to the source code utilized in the instance is received. At block 430, the modification to the source code is identified via the application framework utilized in the instance. In an implementation, the modification to source code 364A is utilized in application image instance 370a in runtime container 380A in FIG. 3.

Referring again to FIG. 4, at block 440, the identified modification to the source code is applied, via the application framework, to the source code during runtime of the instance in the container.

In an implementation, an indication that the runtime container 380A in FIG. 3 is modified is provided by PaaS master component 222. The indication may mark the runtime container as "modified," or "dirty," to differentiate the modified runtime container from one that has not been modified.

In an implementation, prior to the identification of the modification to the source code via the application framework in block 430, a scanning process performed by the application framework is enabled or toggled on. The scanning process is utilized in order to identify modifications to the source code. Modifications may be identified when the scanning process is enabled. When the scanning process is disabled, no modifications may be identified. As described above, the scanning process may be enabled statically. A user (such as a developer) may send a request to enable/disable the scanning process. When a user sends a request to disable the scanning process, the scanning process is disabled which prevents further modification to the source code.

In an implementation, client device 320 may be located remotely from node layer 310. Client device 320 may also be referred to as a second device.

Figure 5:
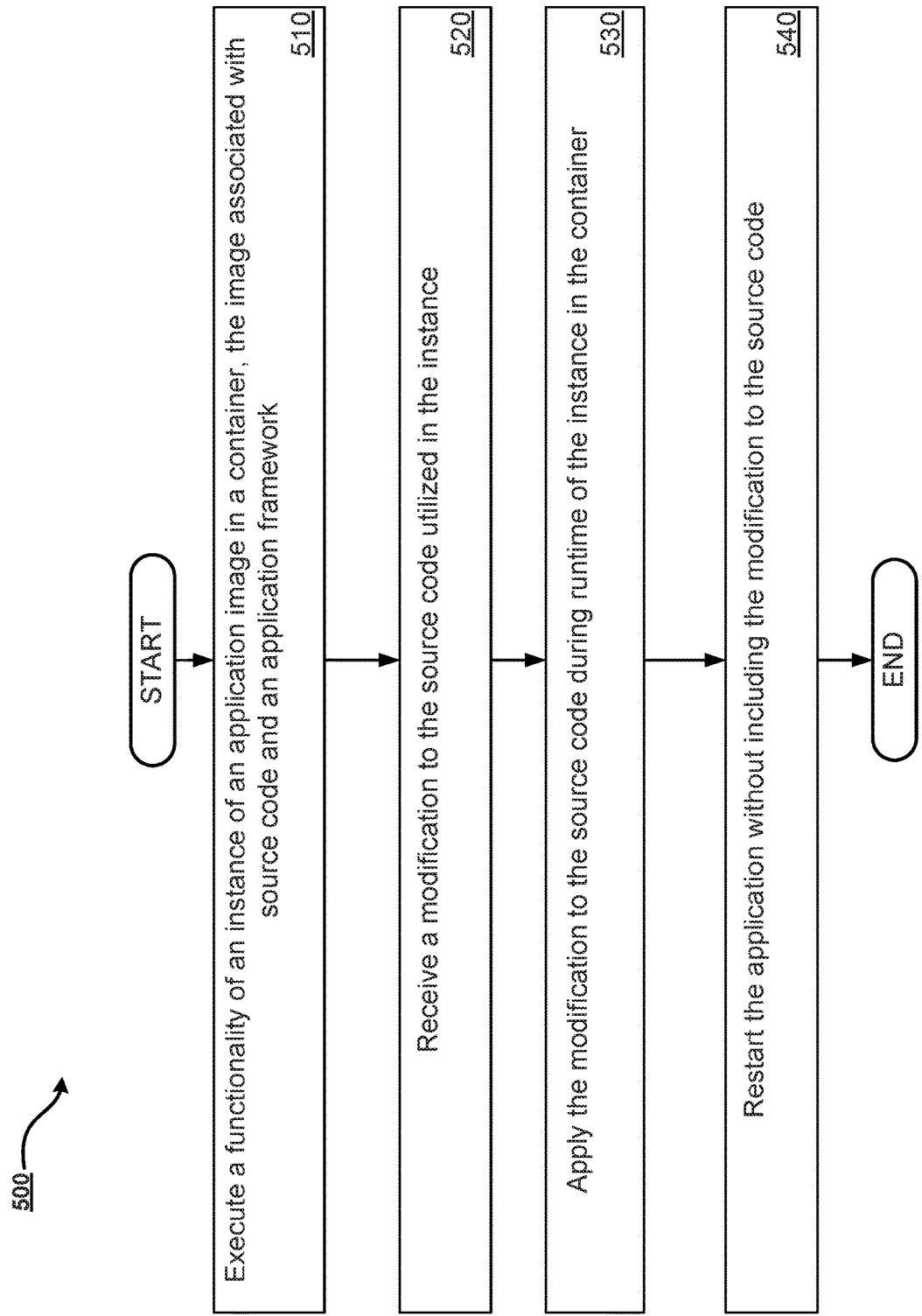
FIG. 5 is a flow diagram illustrating a method for modifying source code of an application image instance and restarting the application without the modification according to an implementation of the disclosure.

FIG. 5 is a flow diagram illustrating a method 500 for modifying source code of an application image instance and restarting the application without the modification according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by node layer 230, including any of nodes 232a-c, of FIG. 2 and/or node layer 310 of FIG. 3.

Method 500 begins at block 510 where a functionality of an instance of an application image in a container is executed. In one implementation, the image is associated with source code and an application framework.

At block 520, a modification to the source code utilized in the instance is received. At block 530, the modification to the source code is applied during runtime of the instance in the container.

At block 540, the application is restarted without including the modification to the source code. Referring to FIG. 3, when application 350 is restarted, the modification to source code 364A is discarded. When runtime container 380A re-launches, source code 364A is restored to its previous state prior to the modification being applied.

In an implementation, a developer may perform a test at block 530 of FIG. 5. The test may be performed to test a functionality of the application in response to applying the modification to the source code. In another implementation, after the application framework applies the modification to the source code, an update to the application may be provided. After the test is complete, the developer may save the modification to the source code prior to restarting the application or discard it. If the developer wishes to save the modification, the developer can use the "dirty" identifier to find the container that includes the modification to the source code. The developer may then save the modification. If the application framework restarts, the update may be discarded as restarting the application framework may return the source code to its previous, unmodified state. If the developer wishes to make permanent modifications to the source code, the developer may save the modification and reload it in a new image or a new version of the image after the application restarts. The image is then built and the application is executed. A new runtime container including the modification may then be launched.

Figure 6:
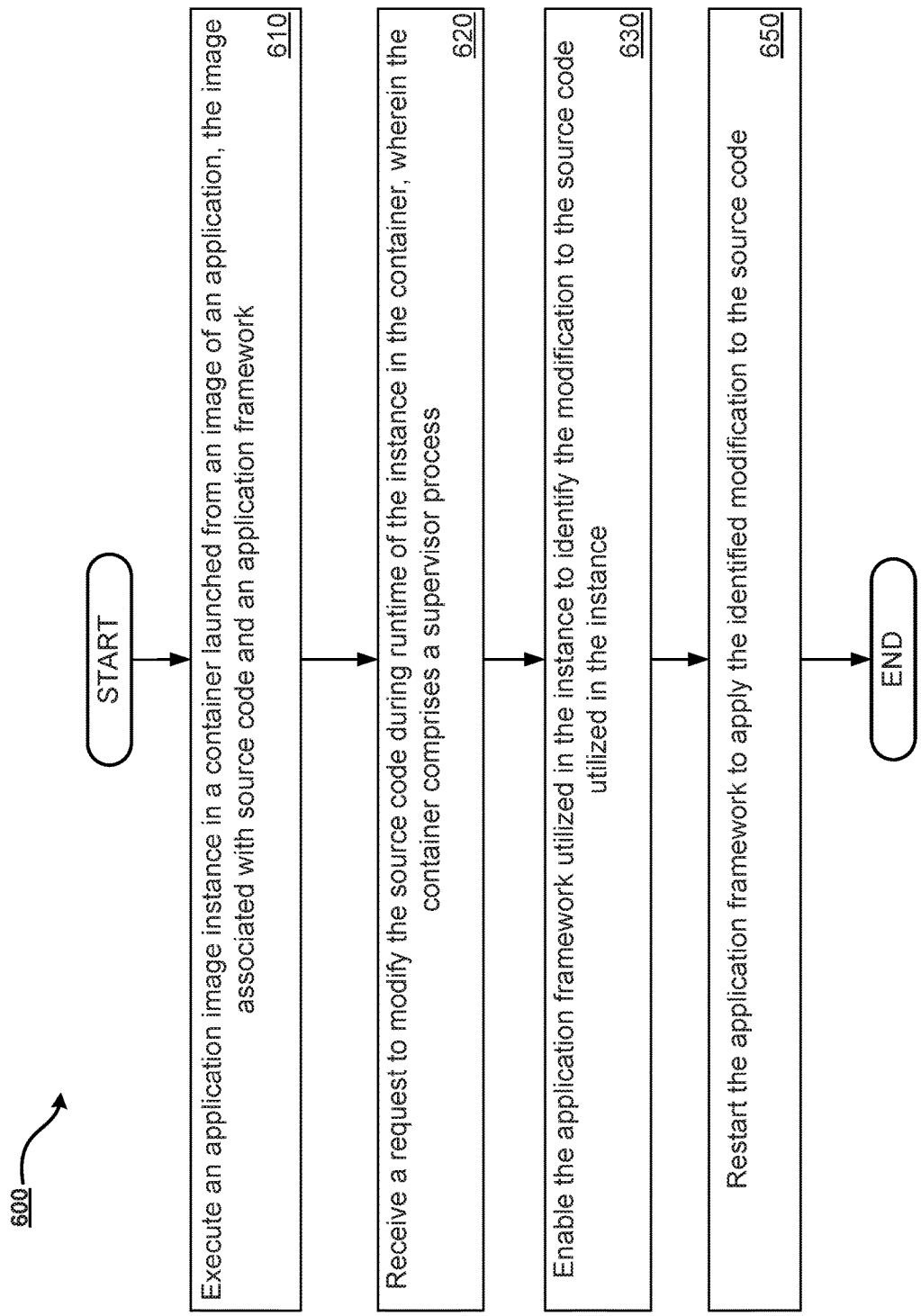
FIG. 6 is a flow diagram illustrating a method for modifying source code of an application image instance using a supervisor process according to an implementation of the disclosure.

FIG. 6 is a flow diagram illustrating a method 600 for modifying source code of an application image instance using a supervisor process according to an implementation of the disclosure. Method 600 may be performed by processing logic that may comprise hardware (e.g., circuitry, dedicated logic, programmable logic, microcode, etc.), software (such as instructions run on a processing device), firmware, or a combination thereof. In one implementation, method 600 is performed by node layer 230, including any of nodes 232a-c, of FIG. 2 and/or node layer 310 of FIG. 3.

Method 600 begins at block 610 where an instance of an application image in a container launched is executed. In one implementation, the image is associated with source code and an application framework.

At block 620, a request to modify the source code is received during runtime of the instance in the container. The container includes a supervisor process. Referring to FIG. 3, modification logic (not shown) in runtime container 380A receives the modification to the source code from PaaS master component 222. The modification logic then provides a request to modify the source code 364A to application framework 363. Application framework 363 receives the request to modify the source code 364A during runtime of application image instance 370a in runtime container 380A. The runtime container 380A includes supervisor process 361. In an implementation, supervisor process 361 may be executed within the runtime container 380A.

At block 630, the application framework utilized in the instance is enabled to identify the modification to the source code utilized in the instance.

At block 650, the application framework is restarted to apply the identified modification to the source code. In an implementation, in order to apply the modification to the source code of the container, the application framework is restarted. The application framework and the application may be restarted.

In an implementation, after the application framework is restarted in block 650, the supervisor process is continually executed. Therefore, the restarting of the application framework does not interrupt the supervisor process and the modification(s) may be applied to the source code.

In an implementation, the modification is applied to the application image instance running in the container but is not applied to the application image used to deploy the application image instance.

In an implementation, an update to the application is provided in response to the application framework applying the modification to the source code. In an implementation, the PaaS master component 222 transmits the modification sent from client device 320 to runtime container 380A.

By utilizing hot deployment and implementing changes to runtime containers during runtime of the application image instance in the container, the use of additional resources and overhead may be reduced.

Although the modification to the source code is described with respect to nodes in a PaaS system, the modification may be applied to nodes in other distributed cluster systems or other nodes that include containers.

Figure 7:
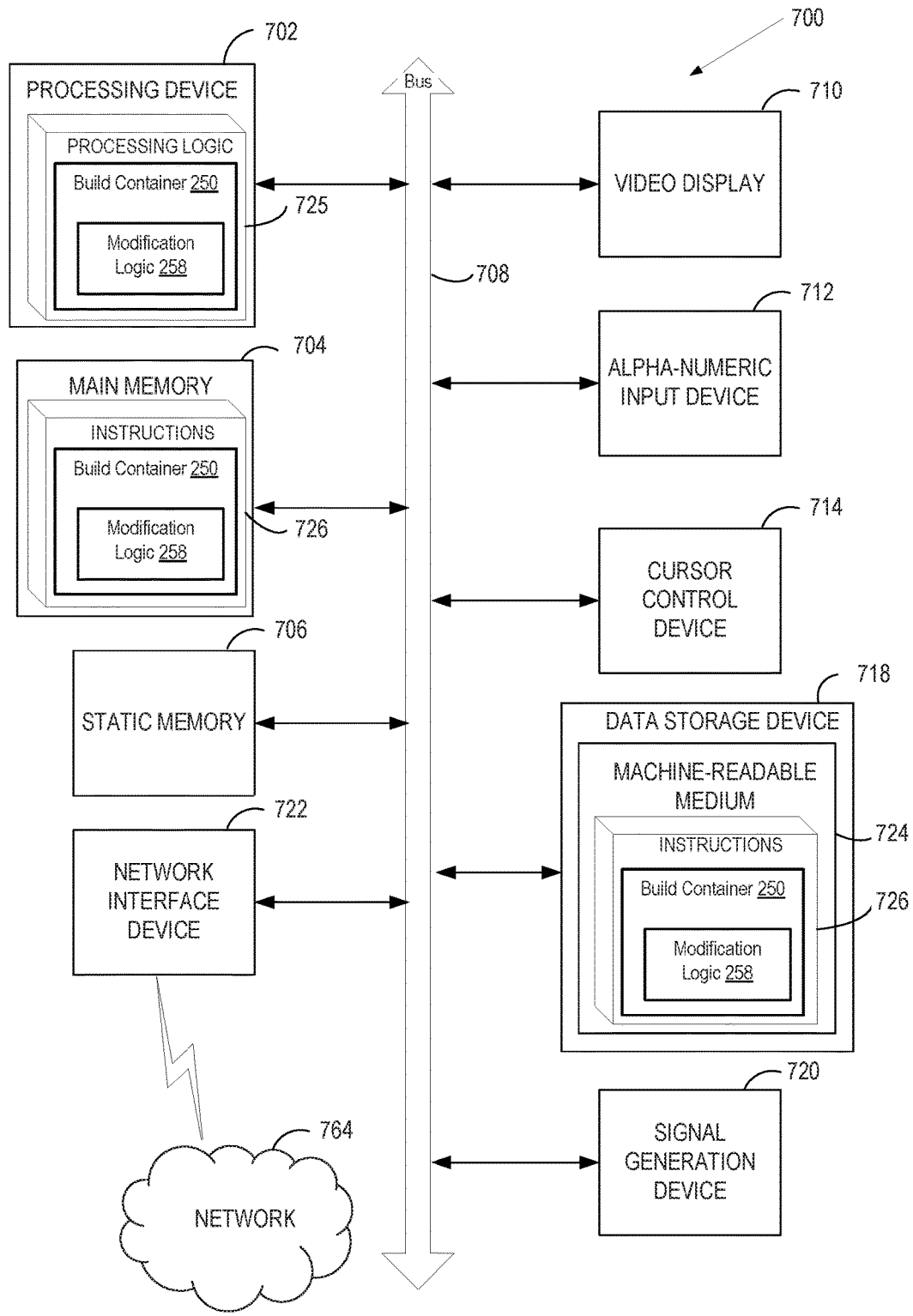
FIG. 7 illustrates a block diagram of one implementation of a computer system.

FIG. 7 illustrates a diagrammatic representation of a machine in the example form of a computer system 700 within which a set of instructions, for causing the machine to perform any of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any of the methodologies discussed herein.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730. Processing device 702 may be communicably coupled to memory 704.

Processing device 702 represents general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be special-purpose processing devices such as an application specific integrated circuit (ASIC), a field programmable gate array (FPGA), a digital signal processor (DSP), network processor, or the like. The processing device 702 may execute the processing logic 726 for performing the operations and steps discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a non-transitory machine-readable storage medium 724 on which is stored software 726 embodying any of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting machine-readable storage media.

The non-transitory machine-readable storage medium 724 may also be used to store instructions 726 to implement modification logic 258 in build container 250 to provide modifications to source code in an application in the PaaS system in a computer system, such as the computer system described with respect to FIG. 1, and/or a software library containing methods that call the above applications. While the machine-readable storage medium 728 is shown in an example implementation to be a single medium, the term "machine-readable storage medium" should be taken to include a single medium or multiple media (e.g., a centralized or distributed database, and/or associated caches and servers) that store the sets of instructions. The term "machine-readable storage medium" shall also be taken to include any medium that is capable of storing, encoding or carrying a set of instruction for execution by the machine and that cause the machine to perform any of the methodologies of the disclosure. The term "machine-readable storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of processes and symbolic representations of operations on data bits within a computer memory. These descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "invoking", "launching", "accessing", "assembling", "committing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The processes and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a non-transitory machine-readable medium having stored thereon instructions, which may be used to program a computer system (or other electronic devices) to perform a process according to the disclosure. A non-transitory machine-readable medium includes any mechanism for storing or transmitting information in a form readable by a machine (e.g., a computer). For example, a non-transitory machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite those features regarded as the disclosure.

What is claimed is:

1. A method comprising:
   launching, by a processing device in a distributed cluster system, a container using an application image, the container comprising an executing instance of the application image, the application image associated with source code and an application framework of an application;
   receiving, by the processing device, a modification to the source code utilized in the instance;
   determining, by the processing device via a supervisor process executing in the container, whether the application framework lacks support for performing a scan process;
   responsive to determine that the application framework lacks the support for performing the scan process, identifying, by the processing device via the supervisor process executing in the container, the modification to the source code using a scan process of the supervisor process;

applying, by the processing device via the application framework, the identified modification to the source code during runtime of the instance in the container; and preventing, by the processing device via the supervisor process, the container from terminating while the identified modification is applied to the source code via the application framework.

2. The method of claim 1, further comprising disabling the application framework and the supervisor process from scanning the container to identify the modification in response to receiving a user request to disable the scanning, wherein the disabling prevents further modification to the source code.

3. The method of claim 1, wherein the modification to the source code is embodied in modified source code on a second device.

4. The method of claim 3, wherein the second device is located remotely from the processing device.

5. The method of claim 3, wherein the second device comprises a synchronization command used to synchronize the source code of the instance with the modified source code.

6. The method of claim 1, wherein the modification to the source code is streamed via a tunnel.

7. The method of claim 1, further comprising scaling a plurality of instances of the application image to the instance of the application image as a single instance prior to receiving the modification to the source code.

8. The method of claim 1, wherein the application framework applies the identified modification to respective source codes of each of a plurality of instances of the application image of the application.

9. A system comprising:
a memory; and
a processing device a distributed cluster system, the processing device communicably coupled to the memory, the processing device to:
launch a container using an application image, the container comprising an executing instance of the application image, the application image associated with source code and an application framework of an application;
receive a modification to the source code utilized in the instance;
determine, via a supervisor process executing in the container, whether the application framework lacks support for performing a scan process;
responsive to determine that the application framework lacks the support for performing the scan process, identify, via the supervisor process executing in the container, the modification to the source code using a scan process of the supervisor process;
apply the modification to the source code during runtime of the instance in the container;
prevent, by the processing device via the supervisor process, the container from terminating while the identified modification is applied to the source code via the application framework; and
restart the application image instance without including the modification to the source code.

10. The system of claim 9, wherein the processing device is further to test the functionality of the application in response to applying the modification to the source code.

11. The system of claim 9, wherein the modification to the source code is embodied in modified source code on a second device.

12. The system of claim 11, wherein the second device is located remotely from the processing device.

13. The system of claim 9, and wherein the modification to the source code is streamed via a tunnel.

14. The system of claim 9, wherein the container system comprises a single container launched from the image of the application.

15. A non-transitory machine-readable storage medium including instructions that, when accessed by a processing device in a distributed cluster system, cause the processing device to:
launch, by the processing device, a container using an application image, the container comprising an executing instance of the application image, the application image associated with source code and an application framework of an application;
receive a modification to the source code utilized in the instance;
identify, via the application framework utilized in the instance, the modification to the source code;
determine, via a supervisor process executing in the container, whether the application framework lacks support for performing a scan process;
responsive to determine that the application framework lacks the support for performing the scan process, identify, via the supervisor process executing in the container, the modification to the source code using a scan process of the supervisor process;
apply, via the application framework, the identified modification to the source code during runtime of the instance in the container; and
preventing, by the processing device via the supervisor process, the container from terminating while the identified modification is applied to the source code via the application framework.

16. The non-transitory machine-readable storage medium of claim 15, wherein the processing device is further to:
disable the application framework and the supervisor process from scanning the container to identify the modification in response to receiving a user request to disable the scanning, wherein the disabling prevents further modification to the source code.

17. The non-transitory machine-readable storage medium of claim 15, wherein the modification to the source code is embodied in modified source code on a second device.

18. The non-transitory machine-readable storage medium of claim 17, wherein the second device comprises a synchronization command used to synchronize the source code of the instance with the modified source code.

19. The non-transitory machine-readable storage medium of claim 15, wherein the processing device is further to:
scale a plurality of instances of the application image to the instance of the application image as a single instance prior to receiving the modification to the source code.

20. The non-transitory machine-readable storage medium of claim 15, wherein the application framework applies the identified modification to respective source codes of each of a plurality of instances of the application image of the application.

* * * * *